(12) United States Patent
Dragicevic et al.

(10) Patent No.: US 11,336,989 B2
(45) Date of Patent: *May 17, 2022

(54) EARPIECE WITH GPS RECEIVER

(71) Applicant: BRAGI GmbH, Munich (DE)

(72) Inventors: Darko Dragicevic, Munich (DE); Peter Vincent Boesen, Munich (DE)

(73) Assignee: BRAGI GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,924

(22) Filed: Jan. 5, 2021

(65) Prior Publication Data
US 2021/0127195 A1     Apr. 29, 2021

Related U.S. Application Data

(63) Continuation of application No. 16/102,052, filed on Aug. 13, 2018, now Pat. No. 10,893,353, which is a
(Continued)

(51) Int. Cl.
| | |
|---|---|
| *H04R 1/10* | (2006.01) |
| *G01S 19/14* | (2010.01) |
| *G01S 19/49* | (2010.01) |
| *G01S 19/34* | (2010.01) |
| *H04S 7/00* | (2006.01) |

(52) U.S. Cl.
CPC .......... *H04R 1/1041* (2013.01); *G01S 19/14* (2013.01); *G01S 19/34* (2013.01); *G01S 19/49* (2013.01); *H04R 1/1016* (2013.01); *H04R 1/1025* (2013.01); *H04R 2420/07* (2013.01);
(Continued)

(58) Field of Classification Search
CPC .................................................. H04R 2460/07
See application file for complete search history.

(56) References Cited

U.S. PATENT DOCUMENTS

| | | |
|---|---|---|
| 2,325,590 A | 8/1943 | Carlisle et al. |
| 2,430,229 A | 11/1947 | Kelsey |
| | (Continued) | |

FOREIGN PATENT DOCUMENTS

| | | |
|---|---|---|
| CN | 204244472 U | 4/2015 |
| CN | 104683519 A | 6/2015 |
| | (Continued) | |

OTHER PUBLICATIONS

Stretchgoal—It's Your Dash (Feb. 14, 2014), pp. 1-14.
(Continued)

*Primary Examiner* — Ping Lee
(74) *Attorney, Agent, or Firm* — Goodhue, Coleman & Owens, P.C.

(57) ABSTRACT

An earpiece includes an earpiece housing, a processor disposed within the earpiece, a speaker operatively connected to the processor, a microphone operatively connected the processor, and a global navigation satellite system (GNSS) receiver disposed within the earpiece. A system may include a first earpiece having a connector with earpiece charging contacts, a charging case for the first earpiece, the charging case having contacts for connecting with the earpiece charging contacts, and a global navigation satellite system (GNSS) receiver disposed within the charging case.

14 Claims, 8 Drawing Sheets

Related U.S. Application Data continuation of application No. 15/449,158, filed on Mar. 3, 2017, now Pat. No. 10,085,082.

(60) Provisional application No. 62/307,088, filed on Mar. 11, 2016.

(52) U.S. Cl.
CPC ...... *H04R 2420/09* (2013.01); *H04R 2460/07* (2013.01); *H04S 7/304* (2013.01)

(56) References Cited

U.S. PATENT DOCUMENTS

| | | |
|---|---|---|
| 3,047,089 A | 7/1962 | Zwislocki |
| D208,784 S | 10/1967 | Sanzone |
| 3,586,794 A | 6/1971 | Michaelis |
| 3,696,377 A | 10/1972 | Wall |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| 5,444,786 A | 8/1995 | Raviv |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,689,252 A | 11/1997 | Ayanoglu et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| 5,844,996 A | 12/1998 | Enzmann et al. |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,185,152 B1 | 2/2001 | Shen |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,522,266 B1 | 2/2003 | Soehren et al. |
| 6,542,721 B2 | 4/2003 | Boesen |
| 6,560,468 B1 | 5/2003 | Boesen |
| 6,563,301 B2 | 5/2003 | Gventer |
| 6,654,721 B2 | 11/2003 | Handelman |
| 6,664,713 B2 | 12/2003 | Boesen |
| 6,681,176 B2 | 1/2004 | Funk et al. |
| 6,690,807 B1 | 2/2004 | Meyer |
| 6,694,180 B1 | 2/2004 | Boesen |
| 6,718,043 B1 | 4/2004 | Boesen |
| 6,721,657 B2 | 4/2004 | Ford et al. |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| 7,532,901 B1 | 5/2009 | LaFranchise et al. |
| D601,134 S | 9/2009 | Elabidi et al. |
| 7,668,652 B2 | 2/2010 | Spencer et al. |
| 7,825,626 B2 | 11/2010 | Kozisek |
| 7,859,469 B1 | 12/2010 | Rosener et al. |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| 8,238,967 B1 | 8/2012 | Arnold et al. |
| 8,253,589 B2 | 8/2012 | Grimm et al. |
| D666,581 S | 9/2012 | Perez |
| 8,300,864 B2 | 10/2012 | Müllenborn et al. |
| 8,406,448 B2 | 3/2013 | Lin et al. |
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,229,227 B2 | 1/2016 | Border et al. |
| 9,317,241 B2 | 4/2016 | Tranchina |

(56) References Cited

U.S. PATENT DOCUMENTS

| | | |
|---|---|---|
| 9,461,403 B2 | 10/2016 | Gao et al. |
| 9,510,159 B1 | 11/2016 | Cuddihy et al. |
| D773,439 S | 12/2016 | Walker |
| D775,158 S | 12/2016 | Dong et al. |
| 9,524,631 B1 | 12/2016 | Agrawal et al. |
| D777,710 S | 1/2017 | Palmborg et al. |
| 9,544,689 B2 | 1/2017 | Fisher et al. |
| D788,079 S | 5/2017 | Son et al. |
| 9,684,778 B2 | 6/2017 | Tharappel et al. |
| 9,711,062 B2 | 7/2017 | Ellis et al. |
| 9,729,979 B2 | 8/2017 | Özden |
| 9,767,709 B2 | 9/2017 | Ellis |
| 9,818,005 B2 | 11/2017 | Yeager et al. |
| 9,821,767 B2 | 11/2017 | Nixon |
| 9,848,257 B2 | 12/2017 | Ambrose et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0102931 A1 | 5/2004 | Ellis et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0197063 A1 | 9/2005 | White |
| 2005/0212911 A1 | 9/2005 | Marvit et al. |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2007/0102009 A1 | 5/2007 | Wong et al. |
| 2007/0239225 A1 | 10/2007 | Saringer |
| 2007/0242834 A1 | 10/2007 | Coutinho et al. |
| 2007/0247800 A1 | 10/2007 | Smith et al. |
| 2007/0269785 A1 | 11/2007 | Yamanoi |
| 2008/0013747 A1 | 1/2008 | Tran |
| 2008/0076972 A1 | 3/2008 | Dorogusker et al. |
| 2008/0090622 A1 | 4/2008 | Kim et al. |
| 2008/0102424 A1 | 5/2008 | Holljes |
| 2008/0146890 A1 | 6/2008 | LeBoeuf et al. |
| 2008/0187163 A1 | 8/2008 | Goldstein et al. |
| 2008/0215239 A1 | 9/2008 | Lee |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2008/0298606 A1 | 12/2008 | Johnson et al. |
| 2008/0318518 A1 | 12/2008 | Coutinho et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0041313 A1 | 2/2009 | Brown |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0182913 A1 | 7/2009 | Rosenblatt et al. |
| 2009/0191920 A1 | 7/2009 | Regen et al. |
| 2009/0215502 A1 | 8/2009 | Griffin, Jr. |
| 2009/0226017 A1 | 9/2009 | Abolfathi et al. |
| 2009/0240947 A1 | 9/2009 | Goyal et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2009/0299215 A1 | 12/2009 | Zhang |
| 2009/0303073 A1 | 12/2009 | Gilling et al. |
| 2009/0304210 A1 | 12/2009 | Weisman |
| 2010/0007805 A1 | 1/2010 | Vitito |
| 2010/0033313 A1 | 2/2010 | Keady et al. |
| 2010/0075631 A1 | 3/2010 | Black et al. |
| 2010/0106356 A1 | 4/2010 | Trepagnier et al. |
| 2010/0166206 A1 | 7/2010 | Macours |
| 2010/0168075 A1 | 7/2010 | Dahlstrom et al. |
| 2010/0203831 A1 | 8/2010 | Muth |
| 2010/0210212 A1 | 8/2010 | Sato |
| 2010/0285771 A1 | 11/2010 | Peabody |
| 2010/0290636 A1 | 11/2010 | Mao et al. |
| 2010/0320961 A1 | 12/2010 | Castillo et al. |
| 2011/0018731 A1 | 1/2011 | Linsky et al. |
| 2011/0103609 A1 | 5/2011 | Pelland et al. |
| 2011/0137141 A1 | 6/2011 | Razoumov et al. |
| 2011/0140844 A1 | 6/2011 | McGuire et al. |
| 2011/0140956 A1* | 6/2011 | Henry ............... G01S 19/05 342/357.3 |
| 2011/0239497 A1 | 10/2011 | McGuire et al. |
| 2011/0286615 A1 | 11/2011 | Olodort et al. |
| 2011/0293105 A1 | 12/2011 | Arie et al. |
| 2012/0057740 A1 | 3/2012 | Rosal |
| 2012/0155670 A1 | 6/2012 | Rutschman |
| 2012/0159617 A1 | 6/2012 | Wu et al. |
| 2012/0162891 A1 | 6/2012 | Tranchina et al. |
| 2012/0163626 A1 | 6/2012 | Booij et al. |
| 2012/0197093 A1 | 8/2012 | LeBoeuf et al. |
| 2012/0197737 A1 | 8/2012 | LeBoeuf et al. |
| 2012/0235883 A1 | 9/2012 | Border et al. |
| 2012/0309453 A1 | 12/2012 | Maguire |
| 2013/0106454 A1 | 5/2013 | Liu et al. |
| 2013/0154826 A1 | 6/2013 | Ratajczyk |
| 2013/0178967 A1 | 7/2013 | Mentz |
| 2013/0200999 A1 | 8/2013 | Spodak et al. |
| 2013/0204617 A1 | 8/2013 | Kuo et al. |
| 2013/0244734 A1 | 9/2013 | Latham et al. |
| 2013/0293494 A1 | 11/2013 | Reshef |
| 2013/0316642 A1 | 11/2013 | Newham |
| 2013/0343585 A1 | 12/2013 | Bennett et al. |
| 2013/0346168 A1 | 12/2013 | Zhou et al. |
| 2014/0002357 A1 | 1/2014 | Pombo et al. |
| 2014/0004912 A1 | 1/2014 | Rajakarunanayake |
| 2014/0010391 A1 | 1/2014 | Ek et al. |
| 2014/0014697 A1 | 1/2014 | Schmierer et al. |
| 2014/0020089 A1 | 1/2014 | Perini, II |
| 2014/0072136 A1 | 3/2014 | Tenenbaum et al. |
| 2014/0072146 A1 | 3/2014 | Itkin et al. |
| 2014/0073429 A1 | 3/2014 | Meneses et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0237518 A1 | 8/2014 | Liu |
| 2014/0270227 A1 | 9/2014 | Swanson |
| 2014/0270271 A1 | 9/2014 | Dehe et al. |
| 2014/0276227 A1 | 9/2014 | Pérez |
| 2014/0279889 A1 | 9/2014 | Luna |

(56) References Cited

U.S. PATENT DOCUMENTS

| | | |
|---|---|---|
| 2014/0310595 A1 | 10/2014 | Acharya et al. |
| 2014/0321682 A1 | 10/2014 | Kofod-Hansen et al. |
| 2014/0335908 A1 | 11/2014 | Krisch et al. |
| 2014/0348367 A1 | 11/2014 | Vavrus et al. |
| 2014/0370917 A1* | 12/2014 | Buchheim .............. H04W 4/026 455/456.1 |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0056584 A1 | 2/2015 | Boulware et al. |
| 2015/0110587 A1 | 4/2015 | Hori |
| 2015/0124058 A1 | 5/2015 | Okpeva et al. |
| 2015/0148989 A1 | 5/2015 | Cooper et al. |
| 2015/0181356 A1 | 6/2015 | Krystek et al. |
| 2015/0230022 A1 | 8/2015 | Sakai et al. |
| 2015/0245127 A1 | 8/2015 | Shaffer |
| 2015/0256949 A1 | 9/2015 | Vanpoucke et al. |
| 2015/0264472 A1 | 9/2015 | Aase |
| 2015/0264501 A1 | 9/2015 | Hu et al. |
| 2015/0310720 A1 | 10/2015 | Gettings et al. |
| 2015/0317565 A1 | 11/2015 | Li et al. |
| 2015/0358751 A1 | 12/2015 | Deng et al. |
| 2015/0359436 A1 | 12/2015 | Shim et al. |
| 2015/0364058 A1 | 12/2015 | Lagree |
| 2015/0373467 A1 | 12/2015 | Gelter |
| 2015/0373474 A1 | 12/2015 | Kraft et al. |
| 2015/0379251 A1 | 12/2015 | Komaki |
| 2016/0033280 A1 | 2/2016 | Moore et al. |
| 2016/0034249 A1 | 2/2016 | Lee et al. |
| 2016/0071526 A1 | 3/2016 | Wingate et al. |
| 2016/0072558 A1 | 3/2016 | Hirsch et al. |
| 2016/0073189 A1 | 3/2016 | Lindén et al. |
| 2016/0094550 A1 | 3/2016 | Bradley et al. |
| 2016/0100262 A1 | 4/2016 | Inagaki |
| 2016/0105207 A1 | 4/2016 | Rosen et al. |
| 2016/0119737 A1 | 4/2016 | Mehnert et al. |
| 2016/0124707 A1 | 5/2016 | Ermilov et al. |
| 2016/0125892 A1 | 5/2016 | Bowen et al. |
| 2016/0140870 A1 | 5/2016 | Connor |
| 2016/0142818 A1 | 5/2016 | Park |
| 2016/0162259 A1 | 6/2016 | Zhao et al. |
| 2016/0209691 A1 | 7/2016 | Yang et al. |
| 2016/0226713 A1 | 8/2016 | Dellinger et al. |
| 2016/0253994 A1 | 9/2016 | Panchapagesan et al. |
| 2016/0324478 A1 | 11/2016 | Goldstein |
| 2016/0352818 A1 | 12/2016 | Han et al. |
| 2016/0353196 A1 | 12/2016 | Baker et al. |
| 2016/0360350 A1 | 12/2016 | Watson et al. |
| 2017/0021257 A1 | 1/2017 | Gilbert |
| 2017/0046503 A1 | 2/2017 | Cho et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0061817 A1 | 3/2017 | May |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0065228 A1 | 3/2017 | Hirano |
| 2017/0078780 A1 | 3/2017 | Qian et al. |
| 2017/0078785 A1 | 3/2017 | Qian et al. |
| 2017/0096065 A1 | 4/2017 | Katsuno et al. |
| 2017/0100277 A1 | 4/2017 | Ke |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0119318 A1 | 5/2017 | Shay et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0150920 A1 | 6/2017 | Chang et al. |
| 2017/0151085 A1 | 6/2017 | Chang et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0164890 A1 | 6/2017 | Leip et al. |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0251295 A1 | 8/2017 | Pergament et al. |
| 2017/0251933 A1 | 9/2017 | Braun et al. |
| 2017/0257698 A1 | 9/2017 | Boesen et al. |
| 2017/0258329 A1 | 9/2017 | Marsh |
| 2017/0263236 A1 | 9/2017 | Boesen et al. |
| 2017/0263376 A1 | 9/2017 | Verschueren et al. |
| 2017/0266494 A1 | 9/2017 | Crankson et al. |
| 2017/0273622 A1 | 9/2017 | Boesen |
| 2017/0280257 A1 | 9/2017 | Gordon et al. |
| 2017/0297430 A1 | 10/2017 | Hori et al. |
| 2017/0301337 A1 | 10/2017 | Golani et al. |
| 2017/0361213 A1 | 12/2017 | Goslin et al. |
| 2017/0366233 A1 | 12/2017 | Hviid et al. |
| 2018/0007994 A1 | 1/2018 | Boesen et al. |
| 2018/0008194 A1 | 1/2018 | Boesen |
| 2018/0008198 A1 | 1/2018 | Kingscott |
| 2018/0009447 A1 | 1/2018 | Boesen et al. |
| 2018/0011006 A1 | 1/2018 | Kingscott |
| 2018/0011682 A1 | 1/2018 | Milevski et al. |
| 2018/0011994 A1 | 1/2018 | Boesen |
| 2018/0012228 A1 | 1/2018 | Milevski et al. |
| 2018/0013195 A1 | 1/2018 | Hviid et al. |
| 2018/0014102 A1 | 1/2018 | Hirsch et al. |
| 2018/0014103 A1 | 1/2018 | Martin et al. |
| 2018/0014104 A1 | 1/2018 | Boesen et al. |
| 2018/0014107 A1 | 1/2018 | Razouane et al. |
| 2018/0014108 A1 | 1/2018 | Dragicevic et al. |
| 2018/0014109 A1 | 1/2018 | Boesen |
| 2018/0014113 A1 | 1/2018 | Boesen |
| 2018/0014140 A1 | 1/2018 | Milevski et al. |
| 2018/0014436 A1 | 1/2018 | Milevski |
| 2018/0034951 A1 | 2/2018 | Boesen |
| 2018/0040093 A1 | 2/2018 | Boesen |
| 2018/0042501 A1 | 2/2018 | Adi et al. |
| 2018/0056903 A1 | 3/2018 | Mullett |
| 2018/0063626 A1 | 3/2018 | Pong et al. |
| 2020/0178013 A1* | 6/2020 | Goldstein .............. G16H 10/20 |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 11/1981 |
| GB | 2508226 A | 5/2014 |

(56) References Cited

FOREIGN PATENT DOCUMENTS

| | | |
|---|---|---|
| JP | 06292195 | 10/1998 |
| WO | 2008103925 A1 | 8/2008 |
| WO | 2008113053 A1 | 9/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |
| WO | 2016187869 A1 | 12/2016 |

OTHER PUBLICATIONS

Stretchgoal—The Carrying Case for The Dash (Feb. 12, 2014), pp. 1-9.
Stretchgoal—Windows Phone Support (Feb. 17, 2014), pp. 1-17.
The Dash + The Charging Case & The BRAGI News (Feb. 21, 2014), pp. 1-12.
The Dash—A Word From Our Software, Mechanical and Acoustics Team + An Update (Mar. 11, 2014), pp. 1-7.
Update From BRAGI—$3,000,000—Yipee (Mar. 22, 2014), pp. 1-11.
Weisiger; "Conjugated Hyperbilirubinemia", Jan. 5, 2016.
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).
Akkermans, "Acoustic Ear Recognition for Person Identification", Automatic Identification Advanced Technologies, 2005 pp. 219-223.
Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XP055334602, DOI: 10.3390/s151025681 the whole document.
Announcing the $3,333,333 Stretch Goal (Feb. 24, 2014) pp. 1-14.
Ben Coxworth: "Graphene-based ink could enable low-cost, foldable electronics", "Journal of Physical Chemistry Letters", Northwestern University, (May 22, 2013), pp. 1-7.
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI is on Facebook (2014), pp. 1-51.
BRAGI Update—Arrival of Prototype Chassis Parts—More People—Awesomeness (May 13, 2014), pp. 1-8.
BRAGI Update—Chinese New Year, Design Verification, Charging Case, More People, Timeline(Mar. 6, 2015), pp. 1-18.
BRAGI Update—First Sleeves From Prototype Tool—Software Development Kit (Jun. 5, 2014), pp. 1-8.
BRAGI Update—Let's Get Ready To Rumble, A Lot To Be Done Over Christmas (Dec. 22, 2014), pp. 1-18.
BRAGI Update—Memories From April—Update on Progress (Sep. 16, 2014), pp. 1-15.
BRAGI Update—Memories from May—Update on Progress—Sweet (Oct. 13, 2014), pp. 1-16.
BRAGI Update—Memories From One Month Before Kickstarter—Update on Progress (Jul. 10, 2014), pp. 1-17.
BRAGI Update—Memories From the First Month of Kickstarter—Update on Progress (Aug. 1, 2014), pp. 1-16.
BRAGI Update—Memories From The Second Month of Kickstarter—Update on Progress (Aug. 22, 2014), pp. 1-15.
BRAGI Update—New People @BRAGI—Prototypes (Jun. 26, 2014), pp. 1-9.
BRAGI Update—Office Tour, Tour To China, Tour to CES (Dec. 11, 2014), pp. 1-14.
BRAGI Update—Status on Wireless, Bits and Pieces, Testing—Oh Yeah, Timeline(Apr. 24, 2015), pp. 1-18.
BRAGI Update—The App Preview, The Charger, The SDK, BRAGI Funding and Chinese New Year (Feb. 11, 2015), pp. 1-19.
BRAGI Update—What We Did Over Christmas, Las Vegas & CES Jan. 19, 2015, pp. 1-21.
BRAGI Update—Years of Development, Moments of Utter Joy and Finishing What We Started(Jun. 5, 2015), pp. 1-21.
BRAGI Update—Alpha 5 and Back to China, Backer Day, On Track(May 16, 2015), pp. 1-15.
BRAGI Update—Beta2 Production and Factory Line(Aug. 20, 2015), pp. 1-16.
BRAGI Update—Certifications, Production, Ramping Up (Nov. 13, 2015), pp. 1-15.
BRAGI Update—Developer Units Shipping and Status(Oct. 5, 2015), pp. 1-20.
BRAGI Update—Developer Units Started Shipping and Status (Oct. 19, 2015), pp. 1-20.
BRAGI Update—Developer Units, Investment, Story and Status(Nov. 2, 2015), pp. 1-14.
BRAGI Update—Getting Close(Aug. 6, 2015), pp. 1-20.
BRAGI Update—On Track, Design Verification, How It Works and What's Next(Jul. 15, 2015), pp. 1-17.
BRAGI Update—On Track, On Track and Gems Overview (Jun. 24, 2015), pp. 1-19.
BRAGI Update—Status on Wireless, Supply, Timeline and Open House@BRAGI(Apr. 1, 2015), pp. 1-17.
BRAGI Update—Unpacking Video, Reviews on Audio Perform and Boy Are We Getting Close(Sep. 10, 2015), pp. 1-15.
Farr, Christina: "iPads In Every Hospital: Apple's Plan to Crack The $3 Trillion Health Care Sector", "https://www.fastcompany.com/3069060/artists-and-scientists-are-teaming-with-businesses-and-non-profits-on-gender-concerns" (Mar. 18, 2017).
Healthcare Risk Management Review, "Nuance updates computer-assisted physician documentation solution" (Oct. 20, 2016), pp. 1-2.
Hoffman, "How to Use Android Beam to Wirelessly Transfer Content Between Devices", (Feb. 22, 2013).
Hoyt et. al., "Lessons Learned from Implementation of Voice Recognition for Documentation in the Military Electronic Health Record System", The American Health Information Management Association (2017), pp. 1-8.
Hyundai Motor America, "Hyundai Motor Company Introduces a Health + Mobility Concept for Wellness in Mobility", Fountain Valley, Califorma (2017), pp. 1-3.
International Search Report & Written Opinion, PCT/EP16/70245 (dated Nov. 16, 2016).
International Search Report & Written Opinion, PCT/EP2016/070231 (dated Nov. 18, 2016).
International Search Report & Written Opinion, PCT/EP2016/070247 (dated Nov. 18, 2016).
International Search Report & Written Opinion, PCT/EP2016/07216 (dated Oct. 18, 2016).
International Search Report and Written Opinion, PCT/EP2016/070228 (dated Jan. 9, 2017).
Jain A et al: "Score normalization in multimodal biometric systems", Pattern Recognition, Elsevier, GB, vol. 38, No. 12, Dec. 31, 2005, pp. 2270-2285, XP027610849, ISSN: 0031-3203.
Last Push Before The Kickstarter Campaign Ends on Monday 4pm CET (Mar. 28, 2014), pp. 1-7.
Lovejoy: "Touch ID built into iPhone display one step closer as third-party company announces new tech", "http://9to5mac.com/2015/07/21/virtualhomebutton/" (Jul. 21, 2015).
Nemanja Paunovic et al, "A methodology for testing complex professional electronic systems", Serbian Journal of Electrical Engineering, vol. 9, No. 1, Feb. 1, 2012, pp. 71-80, XPO55317584, Yu.

(56) References Cited

OTHER PUBLICATIONS

Nigel Whitfield: "Fake tape detectors, 'from the stands' footie and UGH? Internet of Things in my set-top box" http://www.theregister.co.uk/2014/09/24/ibc_round_up_object_audio_dlna_iot/ (Sep. 24, 2014).

Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometrics.html", 4 pages (Jul. 28, 2015).

Staab, Wayne J., et al., "A One-Size Disposable Hearing Aid is Introduced", The Hearing Journal 53(4):36-41) Apr. 2000.

\* cited by examiner

EARPIECE WITH GPS RECEIVER

PRIORITY STATEMENT

This application is a continuation of U.S. patent application Ser. No. 16/102,052 filed Aug. 13, 2018 which is a continuation of U.S. patent application Ser. No. 15/449,158 (now U.S. Pat. No. 10,085,082) filed Mar. 3, 2017 which claims priority to U.S. Provisional Patent Application 62/307,088, filed on Mar. 11, 2016, all of which are titled "Earpiece with GPS Receiver", all of which are hereby incorporated by reference in their entireties.

FIELD OF THE INVENTION

The present invention relates to wearable devices. More particularly, but not exclusively, the present invention relates to ear pieces.

BACKGROUND

Earpieces have conventionally had extremely limited functionality and use. However, there are numerous problems in extending use including the lack of space and power considerations. What is needed is an improved earpiece and the ability to track or determine location of a user using an earpiece.

SUMMARY

Therefore, it is a primary object, feature, or advantage of the present invention to improve over the state of the art.

It is a further object, feature, or advantage of the present invention to provide apparatus, methods and systems which allow earpieces to determine location of a user.

It is a still further object, feature, or advantage of the present invention to make use of available Global Navigation Satellite Systems to determine location.

Another object, feature, or advantage is to determine location of an earpiece in a manner limiting power consumption.

Yet another object, feature, or advantage is to determine location of an earpiece allowing for thermal management.

One or more of these and/or other objects, features, or advantages of the present invention will become apparent from the specification and following claims. No single embodiment need provide each and every object, feature, or advantage. Different embodiments may have different objects, features, or advantages. Therefore, the present invention is not to be limited to or by an objects, features, or advantages stated herein.

According to one aspect, an earpiece is provided. The earpiece includes an earpiece housing, a processor disposed within the earpiece, a speaker operatively connected to the processor, a microphone operatively connected the processor, and a global navigation satellite system (GNSS) receiver disposed within the earpiece. There may also be one or more inertial sensors disposed within the earpiece housing and operatively connected to the processor. The at least one inertial sensor may include an accelerometer. The processor may be adapted to determine when the GNSS receiver is not providing current location data and updating a current location of the earpiece based on a last available location from the GNSS receiver and data from the at least one inertial sensor. The earpiece may include a wireless transceiver to communicate a geospatial location determined by the GNSS receiver to another earpiece. The processor may be configured to turn the GNSS receiver off such as in the course of managing battery life or temperature conditions. The GNSS receiver may be a global positioning system (GPS) receiver.

According to another aspect, a method of maintaining a current location of an earpiece is provided. The method includes determining a geospatial location using a global navigation satellite system (GNSS) receiver disposed within the earpiece, updating a current location of the earpiece with the geospatial location, and updating the current location of the earpiece with data from one or more inertial sensors disposed within the earpiece. The step of updating the current location of the earpiece with data from the one or more inertial sensors disposed within the earpiece may be performed if the GNSS receiver is unable to determine a geospatial location such as when a satellite lock is not available or if the GNSS receiver is turned off such as to manage battery life or temperature.

According to another aspect, a system includes a first earpiece having a connector with earpiece charging contacts, a charging case for the first earpiece, the charging case having contacts for connecting with the earpiece charging contacts, and a global navigation satellite system (GNSS) receiver disposed within the charging case. The system may further include a processor disposed within the earpiece and/or an inertial sensor disposed within the earpiece. The system may be configured to convey a geospatial location from the charging case to the processor of the first earpiece. The geospatial location may be conveyed wirelessly from the charging case to the first earpiece. The geospatial location may be conveyed through the connector of the first earpiece. The system may be configured to set a current location using the geospatial location and then update the current location using data from the inertial sensor. The first earpiece may include an ear piece housing, a processor disposed within the earpiece housing, a microphone operatively connected to the processor, and a speaker operatively connected to the processor. The GNSS receiver may be a global positioning system (GPS) receiver.

According to another aspect, a method of maintaining a current location of an earpiece is provided. The method includes determining a geospatial location using a global navigation satellite system (GNSS) receiver disposed within an earpiece charging case, conveying the geospatial location from the earpiece charging case to an earpiece configured to fit within the earpiece charging case for charging, and updating a current location of the earpiece with the geospatial location. The method may further include updating the current location of the earpiece based on movement of the earpiece determined from one or more inertial sensors.

DETAILED DESCRIPTION

Figure 1:
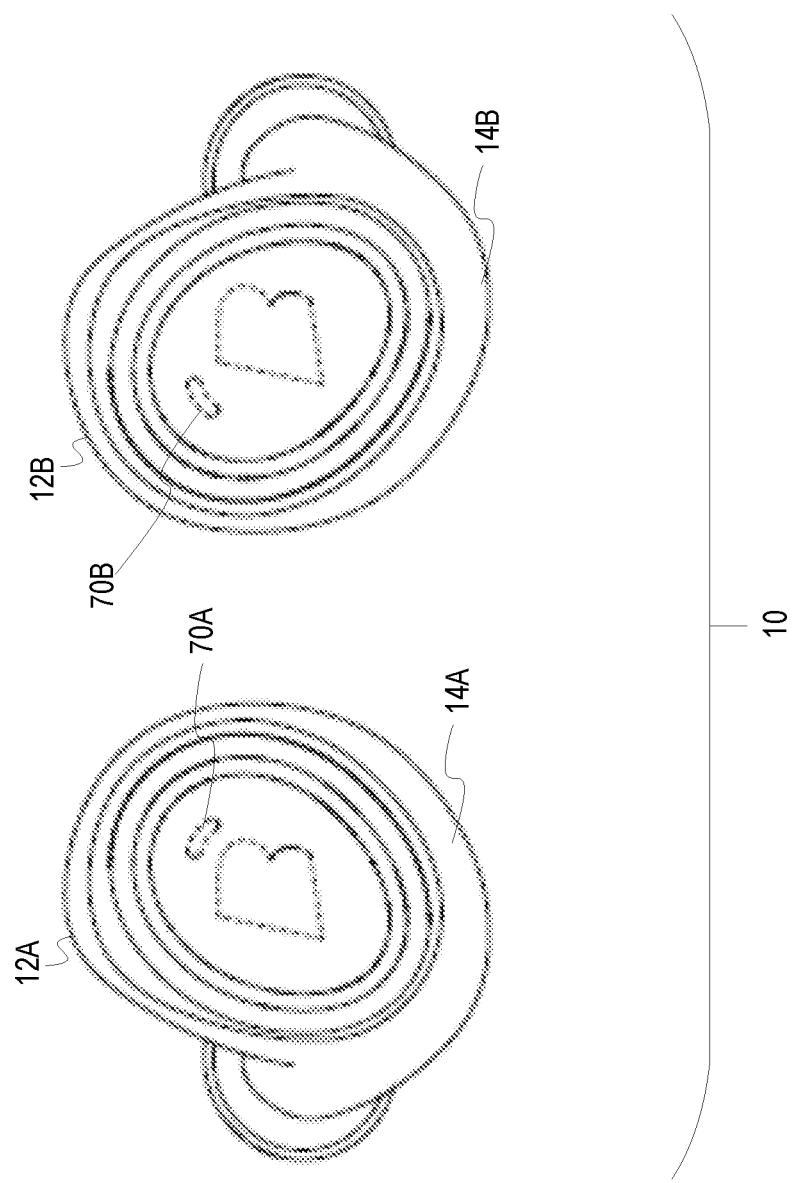
FIG. 1 illustrates a left earpiece and a right earpiece.

FIG. 1 illustrates a set of earpieces 10 including a left earpiece 12A and a right earpiece 12B. The left earpiece 12A has a housing or casing 14A and the right earpiece 12B has a housing or casing 14B. A microphone 70A is shown on the left earpiece 12A and a microphone 70B is shown on the right earpiece 12B.

Figure 2:
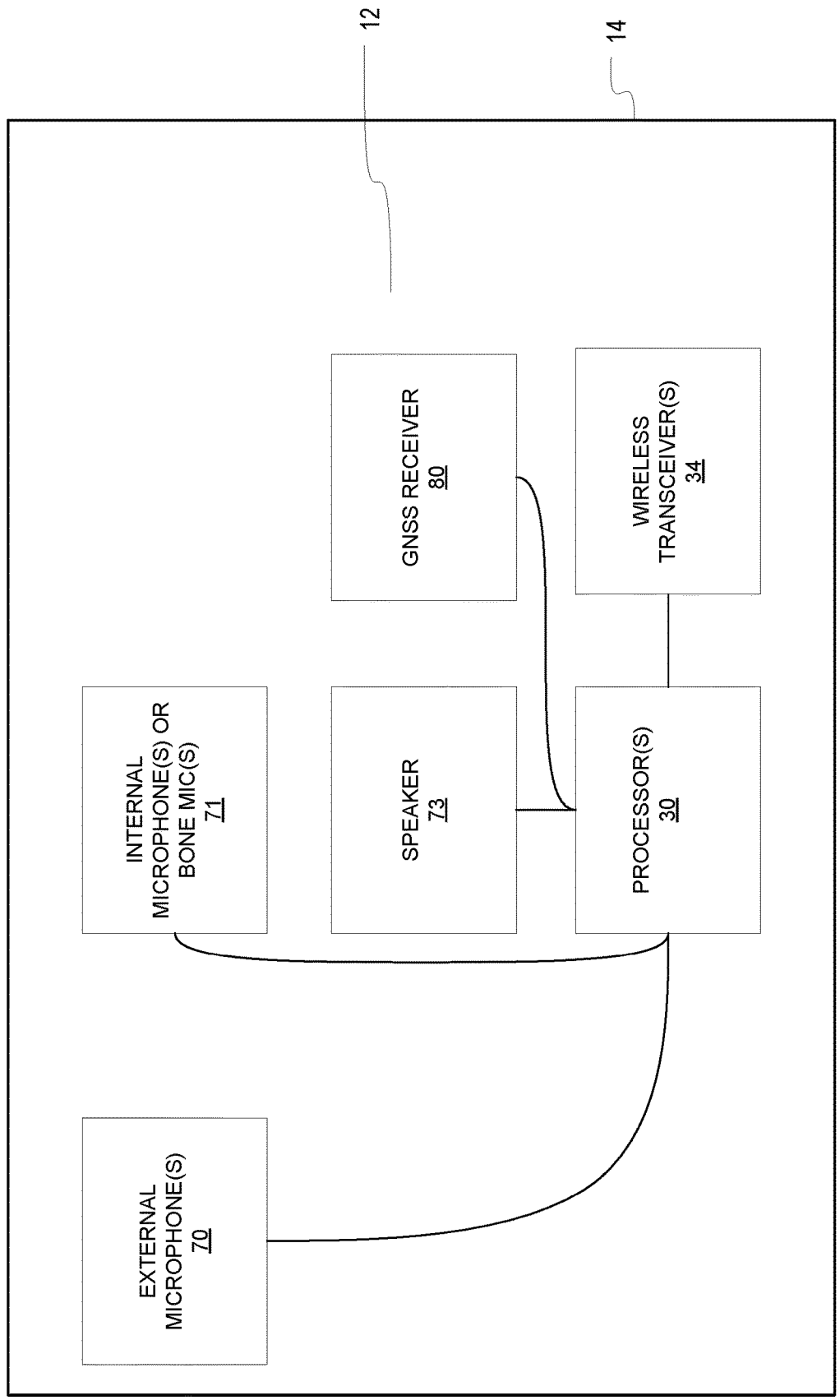
FIG. 2 is block diagram illustrating an earpiece with a GNSS receiver.

FIG. 2 illustrates an earpiece 12 which may be a left earpiece or a right earpiece. One or more processors or other intelligent controls 30 are shown disposed within the housing 14 of the earpiece. One or more wireless transceivers 34 are operatively connected to the processors 30.

The wireless transceivers 34 may include a BLUETOOTH transceiver, an ultra-wideband (UWB) transceiver, or type of radio transceiver, a near field magnetic induction (NFMI) transceiver, or other type of transceiver. One or more external microphones 70 is operatively connected to the processors 30 as are one or more internal microphones or bone microphones 71. A global navigation satellite system (GNSS) receiver is also disposed within the housing 14 of the earpiece 12. The GNSS receiver may be a Global Positioning System (GPS) receiver a Globalnaya Navigazionnaya Sputnikovaya Sistema (GLOSNASS) receiver or other type of GNSS receiver.

Figure 3:
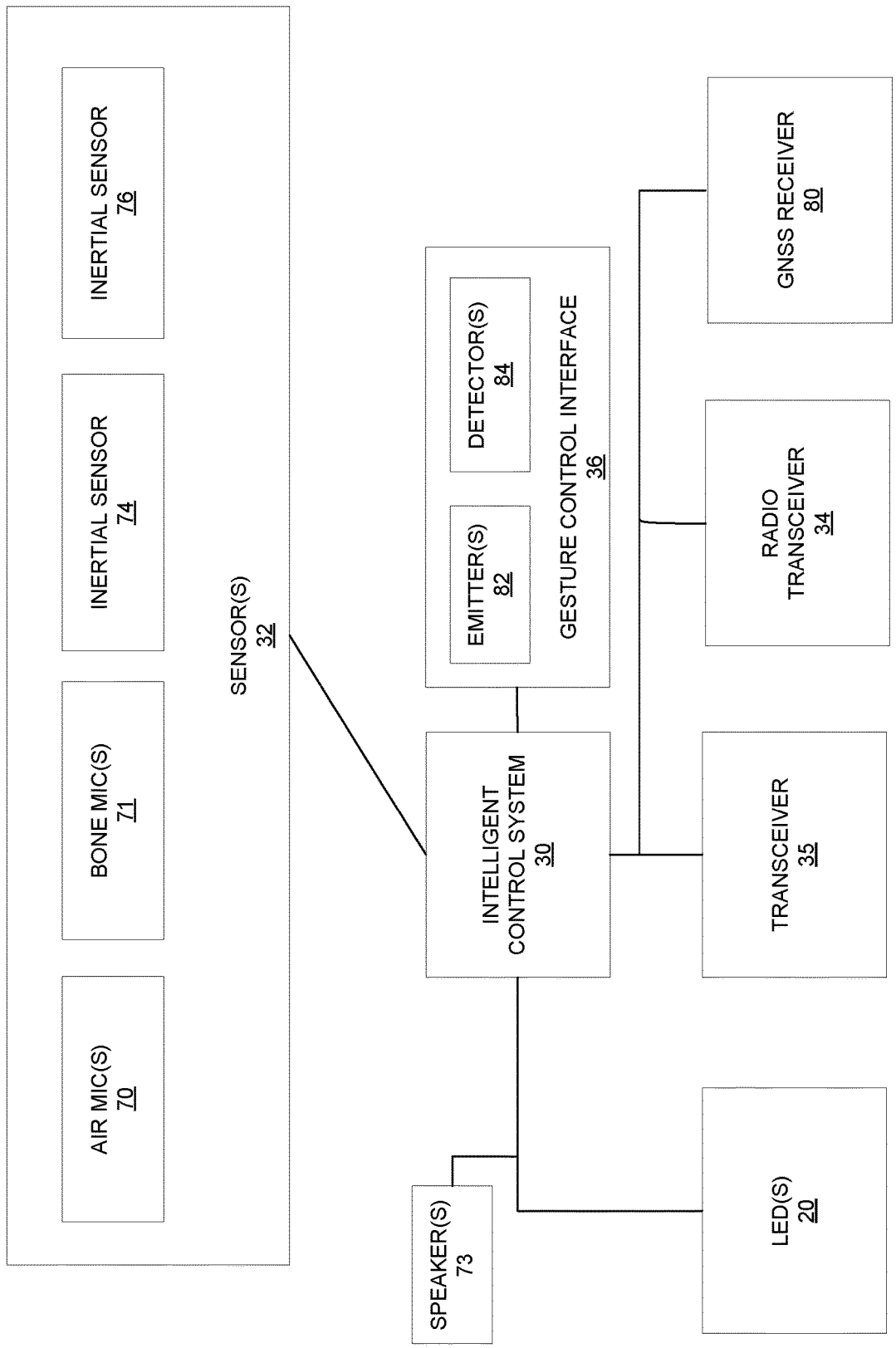
FIG. 3 is another block diagram illustrating an earpiece with a GNSS receiver.

FIG. 3 is a block diagram illustrating an earpiece. The earpiece may include one or more sensors 32. The sensors may include one or more air microphones 70, one or more bone microphones 71, and one or more inertial sensors 74, 76. Each of the one or more sensors 32 is operatively connected to an intelligent control system 30. The intelligent control system 30 may also be operatively connected to a gesture control interface 36 which may include one or more emitters 82 and one or more detectors 84. The gesture control interface 36 allows a user to interact with the earpiece through gestures or motions which are detected by the gesture control interface and interpreted by the intelligent control system 30. One or more speakers 72 is operatively connected to the intelligent control system 30. One or more light emitting diodes 20 are operatively connected to the intelligent control system 30 potentially used to provide visual feedback indicative of earpiece functionality or status. A radio transceiver 34 is shown as well as a second transceiver 35 which may be an NFMI transceiver or other type of transceiver.

Figure 4:
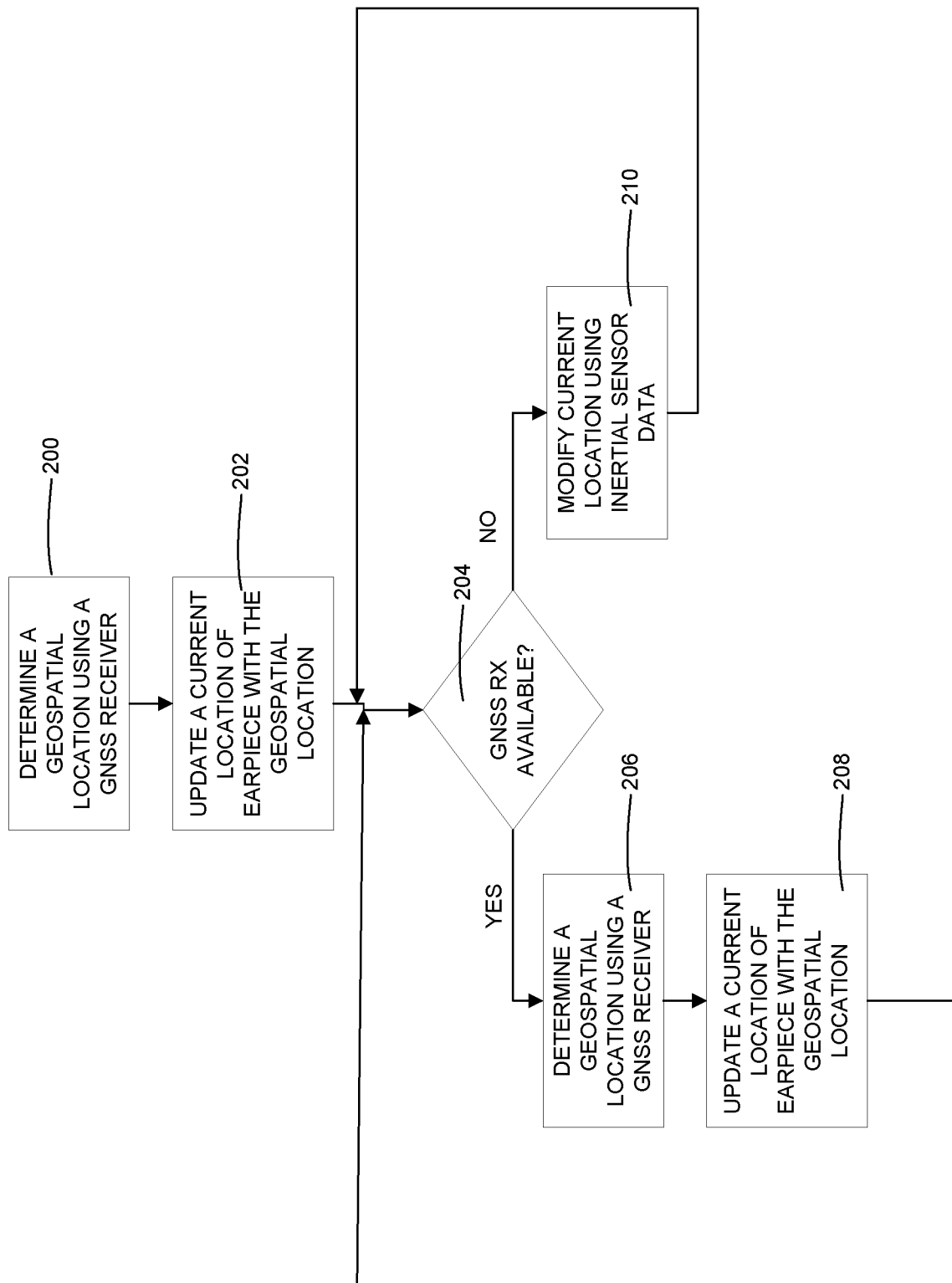
FIG. 4 is a flow chart illustrating one method of determining location of an earpiece.

FIG. 4 illustrates one example of a methodology. In step 200 a determination is made regarding a geospatial location using a GNSS receiver. A geolocation or position is determined in step 200 and in step 202 a current location of the earpiece may be updated with the geospatial location. In step 204 a determination is made as to whether the GNSS receiver is still available. It is contemplated information from the GNSS receiver may not always be available for several reasons. First, in order to extend battery life of the earpiece or to otherwise better manage battery life the earpiece may turn off the GNSS receiver of the earpiece. Thus, when turned off the GNSS is not considered available. There are other instances where the GNSS receiver may also be turned off. For example, if the temperature associated with the earpiece exceeds a threshold the GNSS receiver may be turned off as a part of thermal management procedures. Regardless of whether the GNSS receiver is off or on it may not always be available to provide position information. For example, if the earpiece is indoors, underground, in an area where there is interference, the signal is being jammed, the GNSS receiver is unable to get a satellite lock and unable to provide position data. In these instances, when the GNSS is not available (for whatever reason(s)), position may still be determined or tracked. This is performed by using information from one or more inertial sensors providing inertial sensor data. The inertial sensor data may be used to sense or infer movement. The earpiece may calculate a current location based on changes in position determined from the inertial data. Thus position may be determined even though a geolocation is not available directly from the GNSS receiver.

Below is one example of pseudo-code which may be used to determine a current location using a GNSS receiver if available and calculate a current location from a last known location and inertial data.

```
If GNSS_receiver_available:
    current_loc = Get_geoloc( )
        current_loc_time = Get_time( )
    else:
        current_loc = calculate_loc (current_loc,
    current_loc_time)
        current_loc_time = Get_time( )
```

It is contemplated; however, this methodology may be implemented in any number of ways to reduce the processing resources used. For example, position may only be updated when the amount of change in position as determined by the inertial sensor exceeds a particular threshold. Similarly, if the inertial sensors determine there is very little change in position then the earpiece may turn off or power down or change modes of power consumption for the GNSS receiver to conserve resources. For example, the pseudocode below illustrates one way of powering down the GNSS if the earpiece is not moving or has entered a power saving mode.

```
If not_moving or power_save_mode:
    PowerdownGNSS( )
    GNSS_receiver_available = 0
```

It is contemplated; however, the methodology may be implemented in any number of ways in addition to what is shown and described herein.

Figure 5:
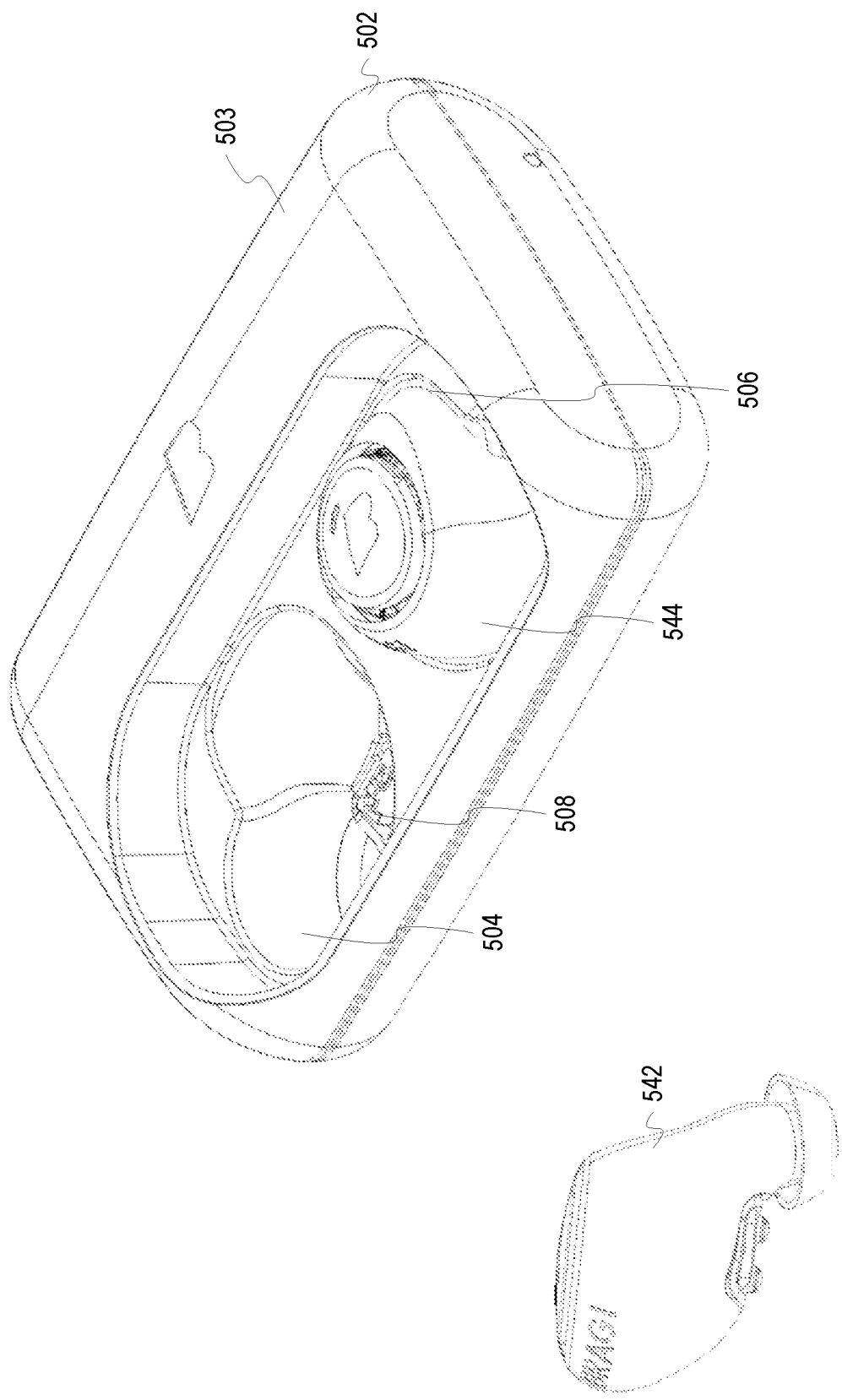
FIG. 5 illustrates a pair of earpieces and a charging case.
Figure 6:
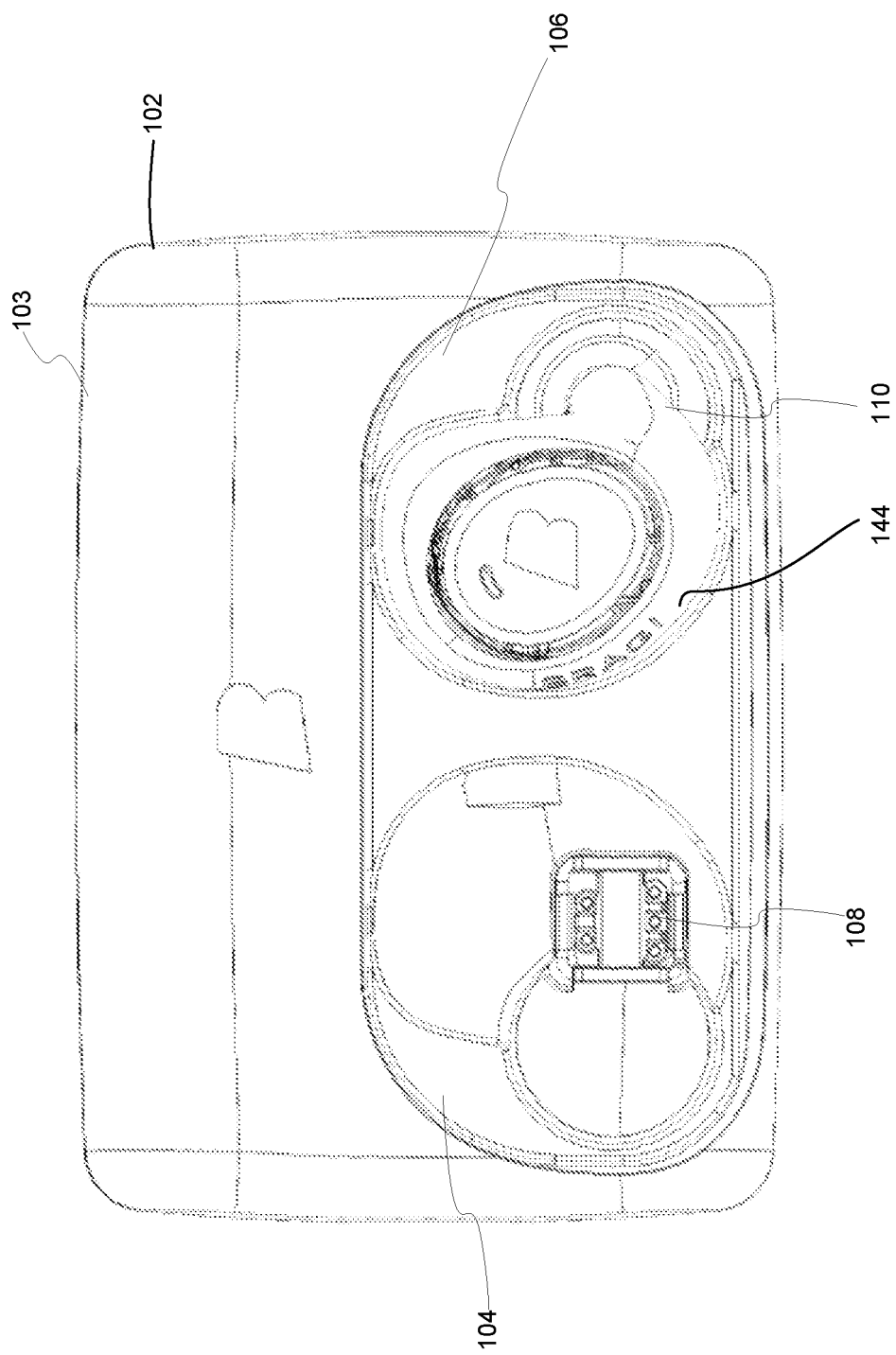
FIG. 6 illustrates another view of a charging case.

Instead of or in addition to having a GNSS receiver in one or more earpieces, the one or more earpieces may have a charging case associated with them. FIG. 5 illustrates one example of a charging case 502 with a case housing 503. A first earpiece area 504 and a second earpiece area 506 are shown for receiving earpieces 12A, 12B, respectively. The earpieces 12A, 12B are matingly connected or otherwise come in contact with contacts 508, 506. Thus, for example the contacts 510 of earpiece 12A come into contact with the contacts 508 of the charging case 502. When earpieces 12A, 12B are received in the earpiece areas 504, 506, the connections are made to allow for charging of the earpieces 12A, 12B as well as data communication directly from the charging case 502 the earpieces 12A, 12B. FIG. 6 illustrates another view of the charging case 502 to show the contacts 508 of the charging case 502 at a different angle. The contacts may take on multiple forms, shapes, sizes, connectors, or materials.

Figure 7:
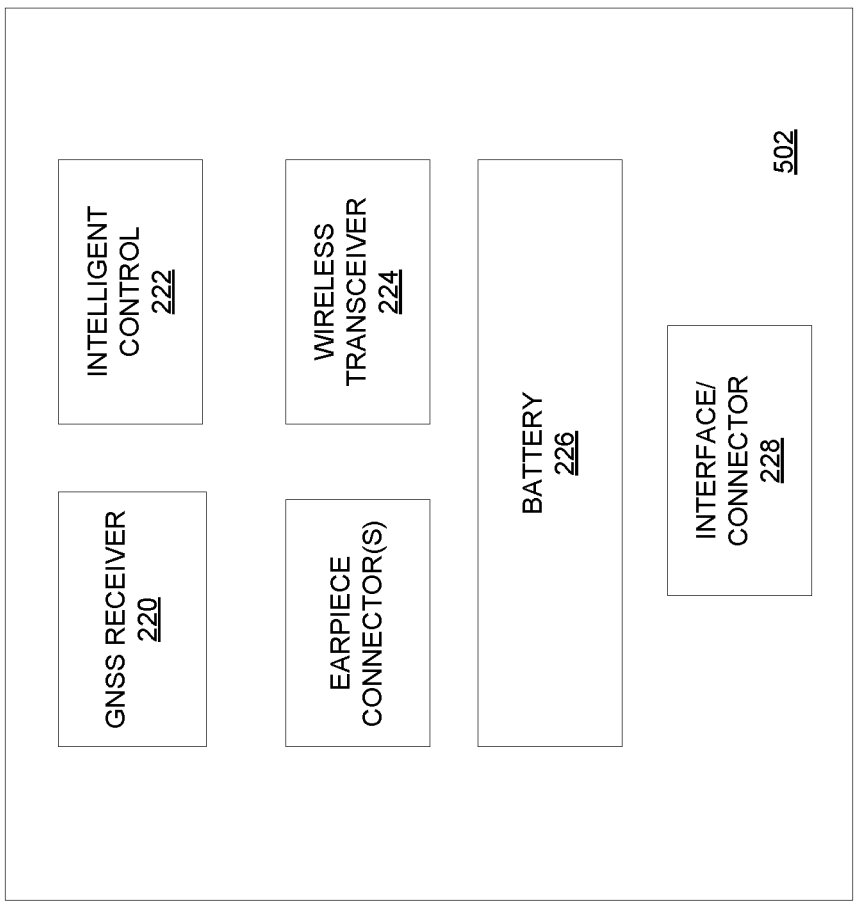
FIG. 7 is a block diagram illustrating a charging case.

FIG. 7 illustrates a block diagram of one embodiment of a charging case 502. The charging case 502 may include a GNSS receiver 220, an intelligent control 222 operatively connected to the GNSS receiver 220, one or more earpiece connectors 508 for coming in contact with the earpiece and operatively connected to the intelligent control 222, a wireless transceiver 224 operatively to the intelligent control 222, a battery 226 disposed within the housing of the charger 502 and an interface/connector 228 which may be a USB type interface to allow the charger 502 to be charged. The wireless transceiver 224 may receive position information determined by the GNSS receiver 220 and wirelessly communicate the position information to one or more earpieces when the one or more earpieces are not connected. The GNN receiver 220 may also communicate position information to one or more earpieces when the earpieces are connected to the charging case.

It is contemplated in many applications the earpieces are not located far from the charging case such as when a person is using the earpieces at home, at work, at the gym, or while travelling. In addition, the charging case may be plugged-in and charged more regularly and the battery 226 may have greater capacity than any batteries in the earpieces. Thus, it may be advantageous in certain implementations to place the GNSS receiver 220 in the charging case 502. Thus, the earpieces still have access to GNSS position data and can use the data as an approximate position of the earpieces or calculate position based on a combination of last GNSS position and movement of the earpieces as determined by inertial sensors of the earpieces as previously discussed.

Figure 8:
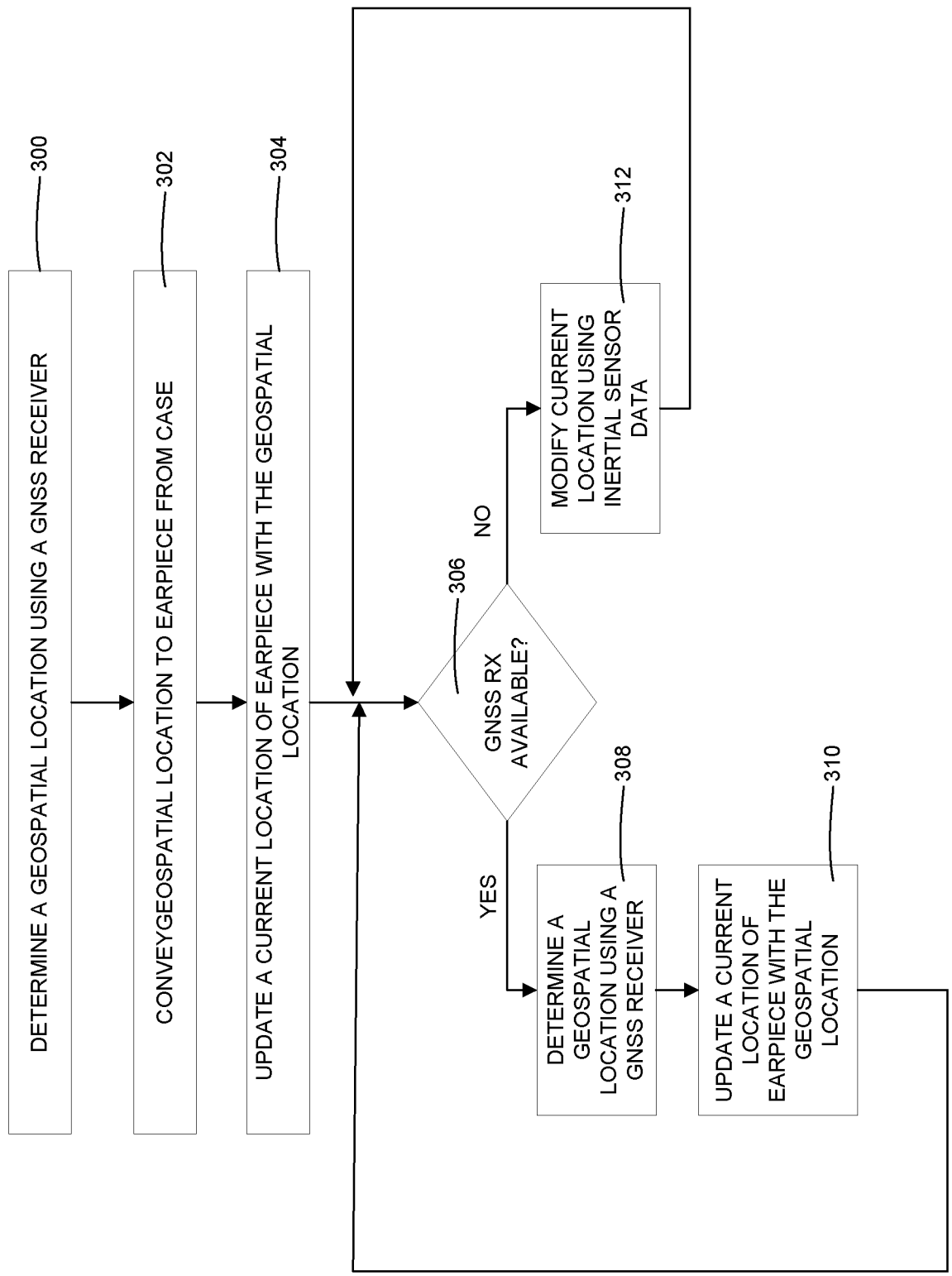
FIG. 8 is a flow chart illustrating another method of determining location of an earpiece.

FIG. 8 illustrates one example of a method. In step 300 a geospatial location is determined using a GNSS receiver. In step 302 the geospatial location is conveyed from the case to the earpiece. This can be through an electrical connection such as when the earpiece is present within the case or can through wireless communication. Alternatively, the geospatial location may be conveyed wirelessly. Next in step 304, the current location of the earpiece may update with the geospatial location. Then in step 306 a determination is made as to whether the GNSS receiver is available. This means there is a connection with the case (either wired or wireless) and the GNSS receiver is receiving location information. If it is not, then in step 312 the current location of the earpieces may be modified using inertial sensor data from one or more sensors of the earpiece. If it is, then in step 308 a geospatial location may be determined using the GNSS receiver and the current location of the earpiece may be updated with the geospatial location.

Thus, an earpiece with a GNSS receiver or which uses a GNSS receiver in its case has been shown and described. The present invention contemplates numerous variations, options, and alternatives including the location of the GNSS receiver, the type of GNSS receiver, the specific algorithms used, the type of materials, and tools used to implement the invention, the number and type of sensors present, the number and type of transceivers present, and any number of other variations.

What is claimed is:

1. An earpiece comprising:
an earpiece housing configured to fit into an ear of a user;
a processor disposed within the earpiece housing;
a speaker operatively connected to the processor;
a microphone operatively connected the processor;
a global navigation satellite system (GNSS) receiver disposed within the earpiece housing;
at least one inertial sensor disposed within the earpiece housing and operatively connected to the processor, wherein the at least one inertial sensor comprises an accelerometer;
a battery disposed within the earpiece housing and operatively connected to the processor and the GNSS receiver;
wherein the processor is adapted to determine when the GNSS receiver is not providing current location data and updating a current location of the earpiece based on a last available location from the GNSS receiver and data from the at least one inertial sensor; and
wherein the processor is configured to turn the GNSS receiver off in response to determining that the GNSS receiver is not providing current location data;
wherein the processor is configured turn the GNSS receiver off to manage life of the battery;
wherein the processor is configured to turn the GNSS receiver off in response to determining a temperature associated with the earpiece exceeds a threshold.

2. The earpiece of claim 1 wherein the earpiece comprises a wireless transceiver to communicate a geospatial location determined by the GNSS receiver to another earpiece.

3. The earpiece of claim 2 wherein the wireless transceiver is a radio transceiver.

4. The earpiece of claim 2 wherein the wireless transceiver is a near field magnetic induction (NFMI) transceiver.

5. The earpiece of claim 1 wherein the GNSS receiver is a global positioning system (GPS) receiver.

6. The earpiece of claim 1 wherein the processor is adapted to determine that the earpiece is not moving based on inertial data from the at least one inertial sensor and if the earpiece is not moving turn the GNSS receiver off.

7. The earpiece of claim 1 wherein the GNSS receiver is a Globalnaya Navigazionnaya Sputnikovaya Sistema (GLOSNASS) receiver.

8. A method of maintaining a current location of an earpiece, the method comprising steps of:
determining a geospatial location using a global navigation satellite system (GNSS) receiver disposed within the earpiece;
updating the current location of the earpiece with the geospatial location;
updating the current location of the earpiece with data from one or more inertial sensors disposed within the earpiece;
turning the GNSS receiver off if a temperature associated with the earpiece exceeds a threshold;
wherein the step of updating the current location of the earpiece with data from the one or more inertial sensors disposed within the earpiece is performed if the GNSS receiver is unable to determine a geospatial location; and
wherein the step of updating the current location of the earpiece with data from the one or more inertial sensors disposed within the earpiece is performed if the GNSS receiver is turned off.

9. The method of claim 8 wherein the earpiece comprises an earpiece housing configured to fit into an ear of the user.

10. The method of claim 8 further comprising if the data from the one or more inertial sensors disposed within the earpiece is indicative that the earpiece is not moving and wherein the turning the GNSS transceiver off is in response to determining the data from the one or more inertial sensos disposed within the earpiece is indicative that the earpiece is not moving.

11. The method of claim 10 further comprising sensing the temperature associated with the earpiece.

12. The method of claim 8 wherein the each of the one or more inertial sensors disposed within the earpiece comprises an accelerometer.

13. The method of claim 8 further comprising determining a time of the geospatial location determined using the GNSS receiver disposed within the earpiece.

14. The method of claim 8 further comprising determining a time associated with updating the current location of the earpiece with data from the one or more inertial sensors disposed within the earpiece.

* * * * *